Figure 1:
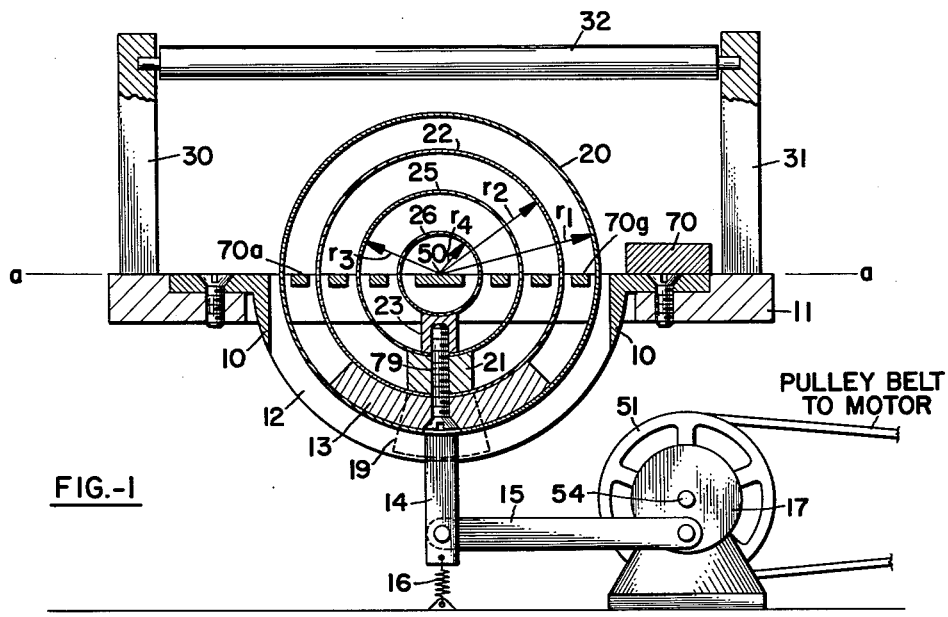

Oct. 30, 1962                P. M. TAFT                3,060,779
                          CUTTING APPARATUS
Filed May 31, 1960                              3 Sheets-Sheet 1

Patrick M. Taft   Inventor
By Richard P. Crowley
                  Attorney

Patrick M. Taft    Inventor

By Richard P. Crowley
Attorney

Oct. 30, 1962 P. M. TAFT 3,060,779
CUTTING APPARATUS

Filed May 31, 1960 3 Sheets-Sheet 3

Patrick M. Taft   Inventor
By Richard P. Crowley
Attorney

United States Patent Office 3,060,779
Patented Oct. 30, 1962

3,060,779
CUTTING APPARATUS
Patrick M. Taft, 34 Martin St., Holyoke, Mass.
Filed May 31, 1960, Ser. No. 32,743
9 Claims. (Cl. 83—582)

The present invention relates to an improved cutting apparatus. In particular, the invention concerns a process and apparatus for the cutting and forming of various geometric forms. More particularly, the invention relates to a process and apparatus for the cutting and forming of tubular segmental forms from block-type insulation materials.

The covering of pipes, tanks, cylinders, tubes, valves, joints, ducts, and the like has in the past created certain problems in regard to the formation of the covering to be applied to the particular surface. The covering of irregular and curvilinear surfaces has, in general, been accomplished by using preformed tubes or other appropriately shaped forms. These coverings are so formed to firmly and snugly fit the surface to be protected in order to ensure maximum effectiveness of insulation, cushioning or other effect. These forms, especially cylindrical tubes for pipe covering, are cut into suitable lengths and generally split open by slitting or ripping along the axial length and hingedly connected in some manner to allow them to be forced, snapped, or placed about the particular form or pipe to be covered. The covering is then made secure with adhesives, metal straps, wire, string, and the like.

In the past, preformed geometrical insulating forms, and particularly tubular pipe covering of various insulating materials, has been preformed prior to installation by various expensive and time consuming methods. Some methods have included the preforming of tubular pipe covering by the rolling of glass fibers, asbestos paper, and other insulating materials about a mandrel-like core until the proper thickness of material has been achieved. This method is time consuming, requires expensive machines with skilled employees, and can create problems in maintaining the proper desired density of the material and insulating thickness. In addition, the rolled material frequently requires some adhesive, mechanical, or drying process means to hold the form in its particular shape.

The present invention relates to a new and improved method and apparatus for the cutting of various geometric forms, which method and apparatus is more efficient and economical than other methods and apparatus used in the past. The present invention provides a method and apparatus for the rapid and efficient cutting of tubular shaped forms from various materials in block form with a reduction of waste material and dust formation. The present invention provides for the cutting of a number of tubular segmental forms in a single operation from various block-type insulating materials. The present invention concerns a cutting apparatus and method for block materials, some of which were not capable of economic preformed shaping heretofore. The present invention provides an apparatus and method for the cutting of semicircular tubes from block-type insulation material, which tubular segments can be readily combined to form tubular pipe covering. The semicircular tubes formed are capable of being interchanged and combined with other similarly cut semicircular tubes to form pipe covering, thus eliminating the need for axial slitting. The nature and scope of the invention will be more apparent from the accompanying drawings and their description.

Figure 2:
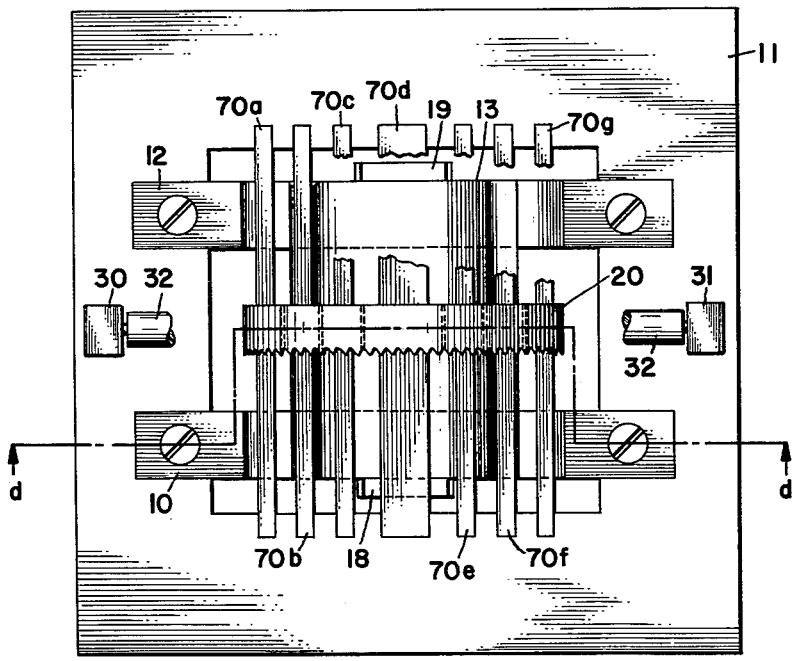
Figure 3:
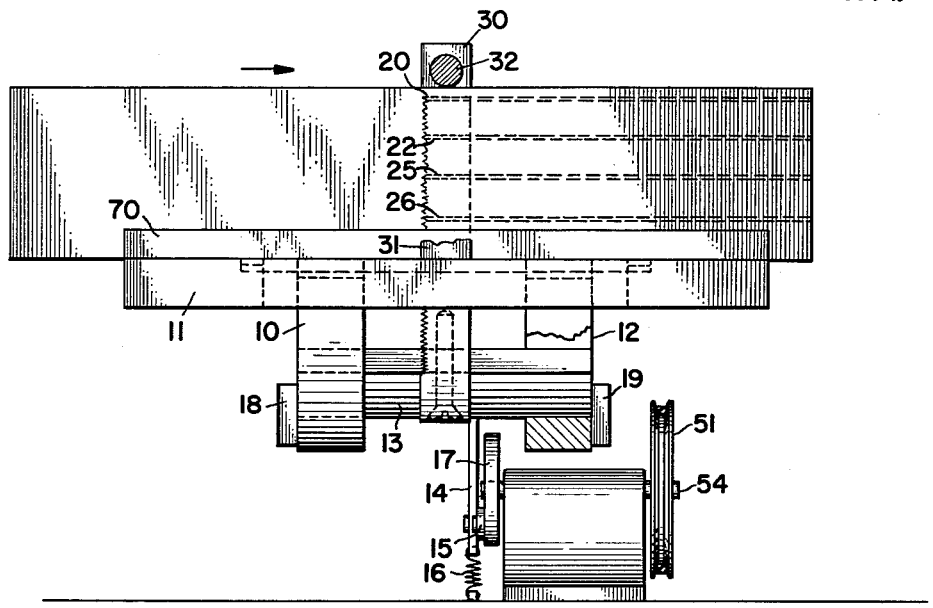
Figure 4:
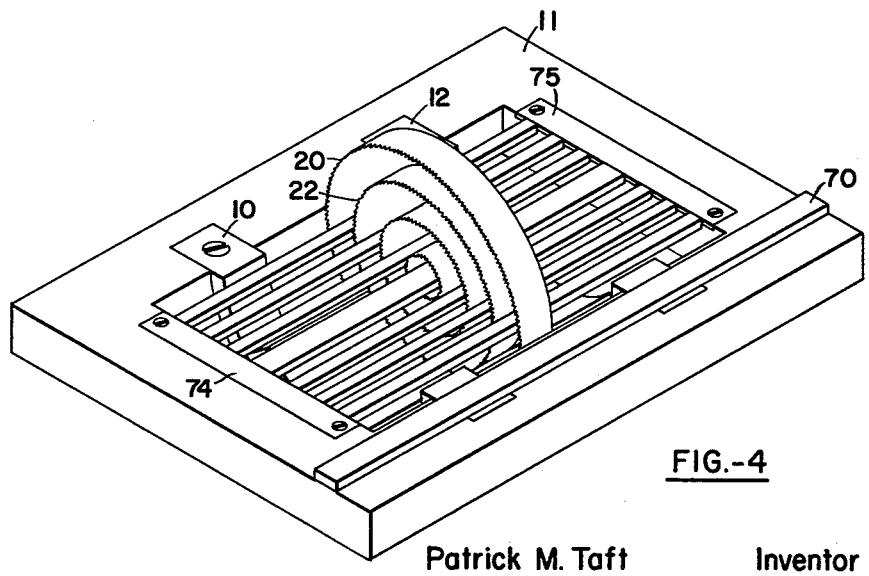
Figure 5:
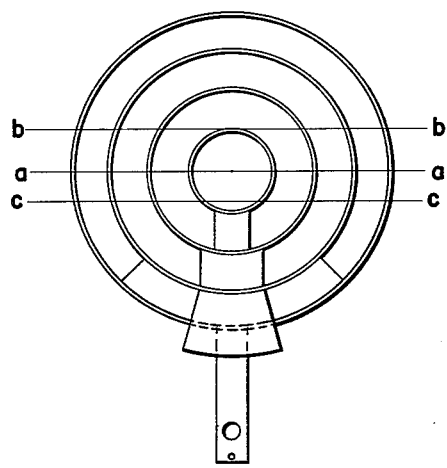
Figure 6:
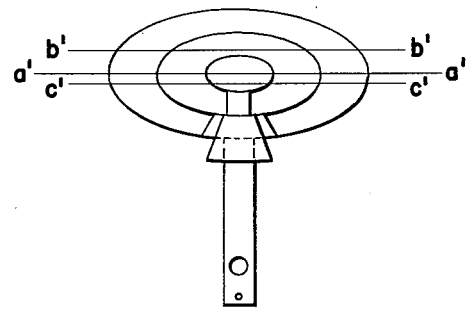
Figure 7:
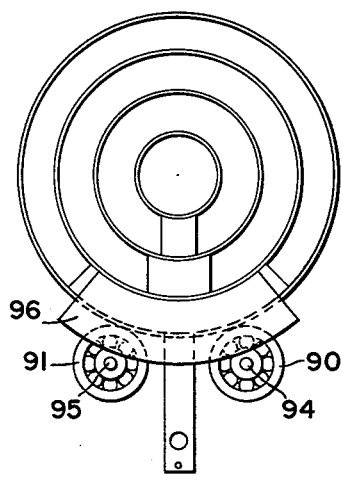
Figure 8:
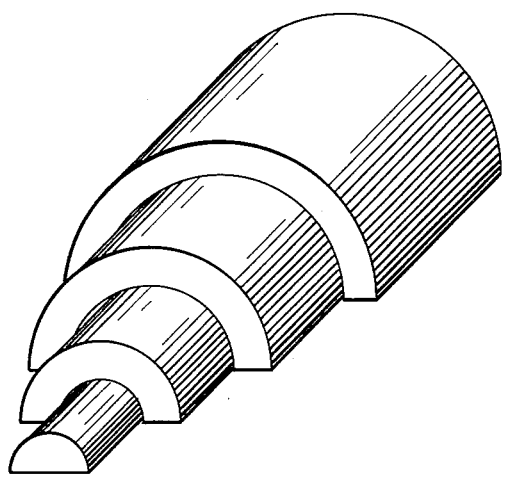

FIGURE 1 is a front view of the inventive apparatus.
FIGURE 2 is a top view of the inventive apparatus.
FIGURE 3 is a side view of the inventive apparatus.
FIGURE 4 is an isometric view of the inventive apparatus.
FIGURE 5 is a front view of the preferred rocker arm assembly.
FIGURE 6 is a front view of an alternate rocker arm assembly.
FIGURE 7 is a front view of an alternate support base.
FIGURE 8 is an isometric view of material cut by the inventive apparatus.

Turning first to FIGURE 1 wherein the inventive apparatus is shown in a front view along line d—d of FIGURE 2, there is shown a metal semicircular concave rocker arm support base 10, the ends of which are bent and firmly fixed to and level with a support table 11 or other relatively fixed support or level surface. In line with, but spatially separated from, said rocker arm base 10 is a similarly constructed rocker arm base 12 seen in FIGURES 2 and 3. Resting upon said bases 10 and 12 and slidably mounted for oscillating back-and-forth motion on said support base is a concave rocker arm 13, said rocker arm being a metal tubular segment of approximately the same outside diameter as the inside diameter of the support bases. At both ends and in the central portion of the rocker arm are located guide lugs 18 and 19 (see FIGURE 2). The lugs project slightly below the lower surface of the rocker arm, and the inner edges of these lugs are approximately parallel and in close contact to the outside edges of the rocker bases 10 and 12, so that these lugs help to guide the rocker arm and prevent excessive vibration of the rocker arm on the base during oscillatory motion. Rigidly secured to the lower central section of the rocker arm is a rocker arm lever 14, which is pivotally connected at its lower end with a cam follower 15. A tension spring 16, one end of which communicates with the lower section of the lever arm and the other end to a fixed support maintains the rocker arm and the support bases in a firm, slidably mounted contact position. The opposite end of the cam follower communicates with a cam 17 which is connected to suitable powered motive cam actuating means, so that rotation of the cam will produce rapid, reciprocal oscillating motion of predetermined stroke length of the rocker arm on the support bases. The cam actuating means shown comprises the cam 17 connected to one end of a fixed rotatable axis 54, while the other end of the axis is connected to a pulley wheel 51, which is driven by an electric motor or other means. Of course, the length of the oscillatory stroke can be adjusted by the selection of a suitable size cam. Of course, any motive means of imparting rapid reciprocal oscillating motion to the rocker arm, whereby the rocker arm is rapidly reciprocally oscillated in contact with the support base, and so the rocker arm will not exceed the upper plane of the support table or the cutting line, will be suitable for the purposes of the invention.

Rigidly attached to the opposite outer surfaces of the outside edges of the concave rocker arm, and in the central section thereof is a firmly fixed, relatively thin, flat metal cutting or serrated saw blade 20 mounted in a curved circular manner, so that the inside center of its circle falls on a point 50, which is located on the upper plane of the support table. The type of knife or saw blade utilized is selected based on the nature of the material to be cut or sawed, the speed and accuracy desirable, and other circumstances. For insulating material such as glass fibers, hair felt, and the like, a serrated saw blade is preferred, because of its rapid, accurate cutting action. Any type of saw blade may be utilized, but especially preferred for insulating material is a saw blade of straight inverted V's which have been bevel sharpened on each side so as to provide a cutting action in both directions. The circle created by the blade has a radius $r_1$. As shown, the outside edges of the blade with the rocker arms forms a complete circle, but accurate circle form is an absolute necessity as shown only for segments of the blade that will be above the cutting line during the extreme positions of the oscillatory motion. The cutting blade is rigidly mounted so as to be capable of rapid reciprocal oscillating motion with the rocker arm without a substantial change in its center of radius or in its diameter. Firmly mounted in the central section of the rocker arm is a first rocker arm spacer 21 of predetermined height or thickness. This first spacer has an outer concave diameter approximately the same as the inner concave diameter of the rocker arm. This first spacer, like the rocker arm, has rigidly attached to the opposite outer surfaces of the outside concave edges of the first spacer and in the central section thereof a firmly fixed relatively thin, flat metal cutting or saw blade 22, like blade 20 mounted in a circular manner, so that the center of the circle falls in a point 50 which is located on the upper plane of the table support as blade 20. The circle created by the blade and spacer has a radius $r_2$, which radius is of predetermined smaller length than radius $r_1$ of blade 20. Firmly mounted above this first spacer is a second spacer 23, constructed in a similar manner, i.e. its outer diameter being approximately the same as the inner diameter of the spacer below, the spacer and attached blade forming a circle, and each spacer and blade fitting snugly to the concave surface of the spacer or rocker arm below. Attached to this spacer are blades 25 and 26 similarly arranged as the circular blades previously described and both having their centers at the point 50 and having radii of $r_3$ and $r_4$, both respectively smaller than the previous blades. For flexibility, the spacers are rigidly secured to the rocker arm by a center bolt 79 extending from the lower surface of the rocker arm upward into the top spacer. This bolt maintains the spacers in a rigid manner during oscillatory motion, but is easily removable to permit spacers and blades of any radius and separation to be rapidly mounted on the rocker arm. The blades, when viewed as in FIGURE 1, from a series of concentric circles having their cutting edges in a common direction, and their blades mounted approximately directly above each other. The common center of these concentric blades is point 50, which center remains the same during oscillatory motion. The rocker assembly comprising the rocker arm and the three spacers and the four blades, with the cutting edges forming a common direction, are mounted for common rapid reciprocal oscillatory motion on the support bases, so that all the blades maintain their circles at the point 50 and maintain their circular diameters constant during the oscillatory motion. The oscillatory motion of the curved blades functions as the cutting means of the invention. It is, of course, within the nature and scope of the invention that there may be more or less spacers and blades of predetermined spacing and radius mounted as described, depending upon the wall thickness, the inside radius, and the number and type of cuts desired in a single cutting operation or pass from the material being cut. As described the rocker arm functions to hold the cutting member in a firm predetermined curved position, serves as a means for mounting the cutting member on a supporting base, and as an object to which oscillatory motion can easily be imparted thereto. Preferred rocker arms have the same geometric shape as the curved cutting member, while especially preferred are those rocker arms in the shape of circular segments. Suitable cutting members include metal knife and saw blades, small diameter round serrated rasp like material or wires capable of a cutting action, and the like.

Located between the blades of the apparatus and having an upper surface on a level with the upper plane a—a of the support table are a series of flat, easily removable, straight metal supporting bars 70a, b, c, d, e, f, and g to help support the material being formed, and to keep the material on a level plane during the feeding and cutting operation. These metal bars are so arranged that the oscillatory motion of the blades is not hindered by them. This is accomplished by the operation of the blades within the opening grill of the bar network. These bars may be seen in isometric form in FIGURE 4. Located on either side of the cutting blades and firmly mounted on the support table are vertical posts 30 and 31, which posts support a rotatable, horizontal height adjustable hold-down cylinder 32, so placed or adjusted that its lower cylindrical surface firmly rests on the upper surface of the block-type material being cut. The hold-down cylinder is thus located approximately above the cutting blades. The purpose of this assembly is to hold the block material being formed in a relatively firm constant position as it passes through the machine and to reduce forming aberrations by excessive vibration of the material being cut. The cylinder is adapted for rotation about its axis so as to reduce frictional forces on the upper surface of the feeding material, and to help increase the speed of feeding material to the apparatus. The cylinder is also capable of height adjustment so as to function with all types of block material of any height or depth. To one side of the apparatus is also seen a guide bar 70, whose function is to help guide the block material in an even manner into the cutting blades.

FIGURE 2 is a top view of the inventive apparatus and shows in more details some of the features described in the preceding description. In particular, the position of the two support bases and the hold-down cylinder can be seen more clearly in their relation to the multiple concentric blades of the rocker.

FIGURE 3 is a side view of the inventive apparatus, which in addition illustrates the manner of feeding and cutting of a series of tubular semicircular forms for pipe covering purposes with the apparatus from a rectangular block piece of glass fiber material. More clearly seen in this view are the positions of the guide lugs 18 and 19, the positions of the support bases 10 and 12, the rocker assembly, and other matter.

FIGURE 4 is an isometric view of the inventive apparatus wherein is shown in another form the apparatus as described having circular blades protruding above the support bars with the center of the concentric blades located at the plane of the support table. In this manner, semicircular tubular forms would be produced from block-type material fed into the blades. Not shown for the sake of clarity is the hold-down cylinder. At the upper and lower ends of the metal support bars previously described are metal holding plates 74 and 75 respectively, which are firmly fixed to the table by recessed crews. These metal plates hold the support bars firmly in position during the cutting operation, but allow the metal bars to be rapidly and easily removed when the rocker assembly is to be replaced.

FIGURE 5 is a front view of the preferred rocker assembly previously described with the rocker arm lever, wherein the series of circular concentric blades are mounted on the rocker arm and supported and separated a predetermined distance by the use of a series of rigid concave-convex spacers. The preferred cutting line or support table level is shown by line a—a, which goes through the common center of the blades. Segmented tubular forms having a circumference less than the circumference of a semicircle can be produced by using a cutting line b—b, while segmented tubular forms having a circumference greater than a semicircle can be cut using cutting line c—c.

FIGURE 6 is an alternate form rocker assembly showing an arrangement of elliptically shaped blades so that oscillatory movement will produce elliptical shaped tubular-type forms. The common center of the major and minor axis is shown on the preferred cutting line a—a, whereby semielliptical forms having the largest possible major axis will be cut, while the other cutting line $b^1$—$b^1$ indicates a cutting line having less than the major axis, while $c^1$—$c^1$ indicates a cutting line for a form of less than the major axis but having a greater elliptical circumference.

FIGURE 7 is a front view of an alternate type of support base, wherein the concave rocker arm assembly rests and oscillates on four axially mounted roll-type bearings 90 and 91 on one side and 92 and 93 on the other side (not shown), the opposing bearings 90 and 92, and 91 and 93 being connected by shafts 94 and 95 respectively. The rocker arm assembly having guide lugs 96 and 97 (not shown) of a longer nature than previously described. The rocker arm then oscillates with respect to these supporting bearings, the oscillating motion being confined between the shafts 95 and 94 with the guide lugs providing constant vibration-free oscillatory motion, and the bearings providing a suitable supporting means for the oscillatory motion of the rocker assembly.

FIGURE 8 is an isometric view of block insulating material such as glass fibers and hair felt after it has been cut by the apparatus into a series of nesting semicircular tubes.

From the above description of the apparatus, the operation of the apparatus may now be described. Block material to be cut into a semicircular tubular form or tubular segments or other curved form is placed or fed onto the top of the support table where a positive manual or mechanical force is placed on the material to propel or guide it along the guide bar in the direction of the oscillating cutting edges of the blades of the apparatus. Block material of any original form, such as Fiberglas in block form, hair felt in roll form, and the like, having a height greater than the radius of the smallest circular blade can be fed to and cut by the apparatus into tubular segmental forms, but the material is preferably in rectangular block form as shown in FIGURE 3. The material can be cut in any length depending only on the length of the form desired, and the length of the original material. Block material as shown in FIGURE 3 travels or is fed into the cutting blades or under the cylindrical hold-down or other firming device. The hold-down device keeps the material from immediately separating and prevents excessive material vibration from affecting the quality and accuracy of the cutting operation. The saw or cutting blades, by the rapid reciprocal oscillatory motion imparted to the rocker arm and its spacers, are oscillating about their common center. The rapid reciprocal oscillatory motion of the rocker arm and its spacers is, of course, confined to the lower semicircular portion of the support base or below the upper plane of the support table or the cutting plane used. The oscillating blades then operate to cut and/or saw with a minimum of dust, the material being manually forced or machine fed into the blade area. The action of the blades, as shown in the drawings, rapidly cuts the material into a series of accurate concentric nesting semicircular tubular shells or tubular segments, each having a common center. The semicircular tubes so cut are then combined with similar cut material of the same inside diameter and wall thickness to form tubular pipe covering and the like.

As described, the many advantages of the apparatus can be more readily seen to be an efficient, rapid, economical method of cutting material in various shapes with a minimum of waste, without the use of skilled labor, and to any desired length. In addition, a minimum of material dust is created, the forms cut semicircular or semielliptical are interchangeable, so that complete tubes or elliptical tubes can be readily formed. The tubular pipe covering formed by the combination of the semicircular tubes needs not be slit or ripped as in the past, and can be previously cut in the block form to the desired length. The material capable of being cut in the manner shown includes insulating material such as magnesia, asbestos, Fiberglas, foam glass, hair felt and the like, plastic and rubber foam materials such as polyether foam, polyurethane, polystyrene, polyethylene, polypropylene, Buna S, Bucron rubber and the like, and other materials capable of being cut or sawed such as wood, plastics, and the likes. The apparatus is especially useful and preferred in the rapid cutting of Fiberglas and hair felt type insulation materials to form semicircular tubes for subsequent use as pipe covering.

A distinct advantage of the present apparatus is its rapid and economic flexibility in being able to cut tubular semicircular and segmented material to varying wall thicknesses and inside diameters. As described, the inside diameter wall thickness of the tubes can be any desired thickness depending on the predetermined spacing between the blades and the nature of the material being cut. This variation in wall thickness and inside diameter is accomplished by varying the radius of the concentric blades and spacers utilized in the apparatus. Normally in the insulation pipe covering, wall thicknesses of $\frac{1}{2}''$, $1''$, $1\frac{1}{2}''$, $2''$, and up to $4''$ are desired, with inside diameters ranging from $36''$ to $\frac{1}{4}''$ with $8''$ to $\frac{3}{8}''$ most commonly used. For example, to cut a series of concentric semicircular tubular shells, the apparatus described may be used with the blades having an $r_1$ of $3''$, an $r_2$ of $1\frac{1}{2}''$, an $r_3$ of $1''$, and an $r_4$ of $\frac{3}{16}''$. Block glass fiber material cut by this apparatus will then form four semicircular tubes as follows:

| Semicircular tubes | Outside radius inches | Inside radius inches | Wall thickness inches |
| --- | --- | --- | --- |
| 1 | 3 | $1\frac{1}{2}$ | $1\frac{1}{2}$ |
| 2 | $1\frac{1}{2}$ | 1 | $\frac{1}{2}$ |
| 3 | 1 | $\frac{3}{16}$ | $\frac{3}{16}$ |
| Waste | $\frac{3}{16}$ | | |

Additional flexibility is obtained by making the rocker arm spacers together with their blades easily detachable from the rocker arm, so that by selection of the proper rocker assembly comprising a rocker arm, spacers, and blades from stock, the desired wall thicknesses and inside diameters may be rapidly obtained. The rapid conversion of the apparatus to cutting varying diameters and wall thicknesses can be accomplished by making the spacers detachably mounted on the rocker arm by recessed screws or other holding means.

The semicircular tubular shells cut as described in the preferred embodiment may be usefully employed in the pipe covering industry where the semicircular sections are hingedly connected into tubular pipe covering by suitable covering means such as by canvas, asbestos paper, glazed paper, cloth, asphalt-type paper, impregnated kraft paper, and other well known covering mediums. The wall thickness of the shells, the inside diameter of the tubes, the type and density of the material employed are, of course, dependent upon the conditions and circumstances of use of the pipe covering desired.

As described, the particular apparatus can also be usefully employed in the cutting of other curved forms and shapes by similar procedures. The type of cutting operation and the shape of the material depend upon the geometric configuration of blades and the amount and speed of oscillatory motion. Thus, by the use of one apparatus or a series of apparatuses operating in combination, other geometric forms can be cut in depth of the desired wall thickness and dimensions. In the case described, rapid oscillatory motion will give varying arc-type segments of tubular shells of more than and less than a semicircular circumference, semicircular tubes for pipe covering preferred. Using the rocker arm and the spacer blades described, smaller tubular shells having various archial chords can be cut by raising the table support level or cutting line above the common center of the concentric rings, while lowering the level will produce tubular segments having a greater circumference than a semicircle.

In addition, the blades can be in any suitable curved shape such as a parabolic or elliptical shape or a combination of these shapes with or without circular shaped blades. In elliptical shapes, the center of the concentric major and minor axes could be at a common point. Where parabolic, elliptical, and other blade curved arc shapes are employed, the efficiency of the apparatus can be maintained by increasing the rapidity of the oscillatory movement while the amount or length of the oscillating stroke on the support bases is decreased over that used for the circle. The necessity and extent of this operation is dependent upon the needed accuracy of the cutting and the nature of the material employed. In concentric circles, these problems are not present, since the distance from the center of the figure to the cutting blade does not vary with the oscillatory motion, but this is not so with the elliptical and other shapes where the distance from the center of the ellipse or curve to the major and minor axes or other common center point varies depending upon the elliptical or other equation of the blade. This is also true of parabolically shaped blades where the distance from the vertex varies greatly with the particular parabolic equation of the blade. Of course, a circle is merely a special form of an ellipse, i.e. it is an ellipse where the major and minor axes are equal to one another. The elliptical segments of the inventive apparatus are generally those ellipses wherein the ratio of the major to the minor axes is from 2/1 to 1/2, with a preferred ratio of 1.5/1 to 3/4, and especially preferred being the circular forms wherein the ratio is approximately 1/1. In these and similar noncircular types of figures, a decrease in the length of the oscillatory motion with an increase in the rapidity of motion along with the selection of a more appropriate cutting edge will allow the appropriate shape to be cut out within the desired limits of accuracy. Naturally, as the elliptical or parabolic blade shaping or equation approaches the shape or equation of a circle, the amount and length of oscillatory motion can increase accordingly with increased or similar accuracy.

As described, the apparatus is thus suitable for cutting tubular segments in depth from various block material.

What is claimed is:

1. A cutting apparatus for forming tubular segments from block-type material, which apparatus comprises in combination:
    a support table having an upper level surface characterized by an opening therein;
    a concave rocker arm support base mounted directly below said support table opening;
    a rocker assembly comprising:
    a first circular arc-shaped rocker arm slidably mounted on the support base for rapid oscillatory motion with respect thereto,
    said first rocker arm having guide lugs at each end and projecting below the rocker arm so that the inner edges are in close contact with the outside edges of the support base thereby preventing excessive vibratory motion of the rocker arm during oscillatory motion,
    a series of rocker arm spacers rigidly attached within the central concave portion of said first rocker arm, said spacers being of predetermined thickness and performing oscillatory motion with said first rocker arm, and
    a series of concentric cutting members comprising relatively thin blades, the ends of which are rigidly attached and form an integral circle with the first rocker arm and the spacers whereby the blades are located substantially above one another with their cutting edges in a common direction and forming a series of concentric circles, but uniformly separated from one another by the predetermined spacer distance, said assembly being mounted for common oscillatory motion with a portion of the blades projecting above the upper surface of the table through the table opening;
    a lever arm, one end of which is pivotally connected to the lower central portion of the first rocker arm whereby direct oscillatory motion is imparted to said assembly and having tension means attached to the other end of said lever arm to maintain the first rocker arm in a firm, slidably mounted contact position with the base during oscillatory motion; and
    driving means adapted to provide oscillatory motion to said rocker assembly through said lever arm whereby a curved cutting action is produced on block material fed into the cutting member to form a series of segmental tubes of varying wall thickness and outside radii.

2. An apparatus as defined in claim 1 wherein said tension means are spring means having one end attached to a fixed support.

3. An apparatus as defined in claim 1 wherein said spacers are rigidly held and detachably connected by bolt means.

4. An apparatus as defined in claim 1 wherein said support base comprises two semicylindrical concave segments axially aligned and spatially separated, whereby the lever arm is pivotally connected and imparts oscillatory motion to said first rocker arm between the spaced support segments.

5. An apparatus as defined in claim 1 wherein said cutting blades are relatively thin serrated saw blades.

6. An apparatus as defined in claim 1 wherein said cutting members have the common center of their circles on the upper level surface of the support table whereby the insulating block material is cut into a series of semicircular nesting tubular forms of predetermined wall thickness and outside radii.

7. An apparatus as defined in claim 1 wherein said first rocker arm has an outer diameter substantially the same as the inner diameter of the concave support base.

8. An apparatus as defined in claim 1 wherein said support base comprises four axially and opposingly mounted roll-type bearings directly supported below the upper table surface whereby said first circular arc-shaped rocker arm is mounted for oscillatory motion thereon.

9. An apparatus as defined in claim 8 wherein said roll-type bearings are axially connected by shafts, said lever arm being directly pivotally connected to the first rocker arm for oscillatory motion between the bearing shafts.

References Cited in the file of this patent

UNITED STATES PATENTS

| 150,918 | Whitcomb | May 12, 1874 |
| 157,703 | Stone | Dec. 15, 1874 |
| 2,609,048 | Samans | Sept. 2, 1952 |
| 2,841,193 | Petrofsky | July 1, 1958 |

FOREIGN PATENTS

| 313,037 | Germany | June 30, 1919 |